United States Patent
Huschke et al.

(10) Patent No.: US 8,374,616 B2
(45) Date of Patent: Feb. 12, 2013

(54) HIERARCHICAL BROADCAST SERVICE WITH BLIND RETRANSMISSION

(75) Inventors: Jörg Huschke, Aachen (DE); Ghyslain Pelletier, Boden (SE); Mai-Anh Phan, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 12/766,977

(22) Filed: Apr. 26, 2010

(65) Prior Publication Data
US 2010/0323707 A1  Dec. 23, 2010

Related U.S. Application Data

(60) Provisional application No. 61/219,535, filed on Jun. 23, 2009.

(51) Int. Cl.
- *H04W 40/00* (2009.01)
- *H04W 4/00* (2009.01)
- *H04B 17/02* (2006.01)
- *H04J 3/16* (2006.01)

(52) U.S. Cl. ......... 455/449; 455/135; 370/468; 370/331

(58) Field of Classification Search .................. 370/468, 370/395.21, 390, 329, 400, 470, 471, 472, 370/473, 474, 328, 330, 331, 333, 401, 332, 370/337, 344; 714/746–748; 455/449, 450, 455/451, 452, 453, 436

See application file for complete search history.

(56) References Cited

U.S. PATENT DOCUMENTS

| | | | |
|---|---|---|---|
| 7,996,744 B2* | 8/2011 | Ojala et al. | 714/748 |
| 2008/0212514 A1* | 9/2008 | Chen | 370/315 |
| 2008/0225782 A1* | 9/2008 | Wang et al. | 370/329 |
| 2009/0219870 A1* | 9/2009 | Wengerter et al. | 370/329 |

FOREIGN PATENT DOCUMENTS

WO  WO2008011898  1/2008

OTHER PUBLICATIONS

3rd Generation Partnership Project. "MBMS Multi Cell SFN Transmission over Areas of Varying Inter Site Distance." 3GPP TSG RAN WG2 #57bis, R2-071411, St. Julian, Malta, Mar. 26-30, 2007.
3rd Generation Partnership Project. "Transmission Near MBSFN Area Boundaries." 3GPP TSG-RAN WG2 #66, R2-092908, San Francisco, California, USA, May 4-8, 2009.
3rd Generation Partnership Project. 3GPP TS 36.300 V9.0.0. 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9). Jun. 2009, pp. 78-86.

* cited by examiner

*Primary Examiner* — Hanh N Nguyen
(74) *Attorney, Agent, or Firm* — Coats & Bennett, P.L.L.C.

(57) ABSTRACT

In a broadcast service area having regions with varying inter site distances between transmitter sites, the robustness of the transmitted signal is set to meet minimum quality of service (QoS) requirements in the region having small ISD, and additional resources are allocated to the region having large ISD to provide greater robustness. The additional resources in the large ISD area may be used for blind retransmissions of either the original data or new data.

34 Claims, 6 Drawing Sheets

HIERARCHICAL BROADCAST SERVICE WITH BLIND RETRANSMISSION

RELATED APPLICATIONS

This application claims the benefit of U.S. Provisional Patent Application 61/219,535 filed on Jun. 23, 2009, which is incorporated herein by reference.

BACKGROUND

The present invention relates generally to broadcast and multicast services in mobile communication networks, and more particularly to a hierarchical transmission of a broadcast service with blind retransmission. The 3rd Generation Partnership Project (3GPP) includes a work item known as Long Term Evolution (LTE) to improve the Universal Mobile Telecommunications System (UMTS) standard in response to increased demand for mobile data services. Multimedia Broadcast and Multicast Service (MBMS) is one service offered in the LTE standard. MBMS is a broadcast service similar to conventional television and radio broadcast systems in which the same content is transmitted to multiple users located in a specific service area, referred to herein as the broadcast service area. Mobile TV, a service that enables mobile terminals to receive ordinary television programs, is one example of an MBMS application.

Two different modes are contemplated for providing MBMS: a single cell transmission and an MBMS Single Frequency Network (MBSFN). With single cell transmission, the broadcast content is transmitted to the user from a single cell and a user may be handed over as it moves from one cell to another. In MBSFN, multiple transmitters in different cells transmit the same broadcast service synchronously using the same resources. There is no need for the network to handover the user as the user moves between cells within the MBSFN service area.

The minimum signal to interference plus noise ratio (SINR) in the MBSFN service area is determined by (thermal) noise and/or interference from remote transmitters. The minimum SINR is inversely proportional to the distance between neighboring base stations, referred to herein as Inter Site Distance (ISD). That is, the minimum SINR for the broadcast service area decreases with increasing ISD.

In the case of a homogeneous MBSFN service area where the ISD is roughly the same between any pair of neighboring base stations, the minimum SINR, denoted $SINR_{min}$, can be determined from the known network parameters and the transmission mode can be chosen accordingly so that the desired reception quality in terms of bit or packet error rate is achieved at the given $SINR_{min}$. Typically, the transmission mode will not be adapted according to the absolute minimum SINR in the MBSFN, but according to an agreed low percentile, e.g., the 5% value, of the SINR distribution. This value will nevertheless be denoted $SINR_{min}$ in the following description. In general, a higher $SINR_{min}$ equates with higher throughput.

In practical networks, the ISD will not be uniform. Some areas may have a relatively large ISD while others have a relatively small ISD. Furthermore, the propagation conditions will be different in different cells, depending on the building structure, antenna heights, percentage of indoor users, and other factors. Therefore, determining an appropriate transmission mode for all cells in the MBSFN service area can be problematic. In existing broadcasting networks, e.g., DVB-T, the transmission mode is simply set according to the $SINR_{min}$ occurring in the MBSFN. This $SINR_{min}$ will typically occur in the geographical areas that are covered with sites of large ISD.

In network deployments/configurations where the $SINR_{min}$ is limited by noise, the $SINR_{min}$ can be increased by increasing the transmit power of the base stations closest to the location where $SINR_{min}$ occurs. This solution is however, limited by the maximum transmit power of the transmitter and probably by regulatory requirements. In other deployments/configurations where the $SINR_{min}$ is determined by the interference from remote base stations, increasing the transmit power bears the risk of causing increased interference in other locations in the MBSFN service area, thereby only moving the location where the $SINR_{min}$ occurs, without actually increasing $SINR_{min}$.

SUMMARY

The present invention provides a hierarchical transmission scheme for a broadcast service transmitted in an area with varying ISD between neighboring transmitters. For simplicity, it is presumed that the broadcast service area comprises a first region with a small ISD and a second region with a large ISD. The terms high and low are not intended to denote a particular ISD, but are used herein to indicate the distance between transmitter sites in the region of large ISD is sufficiently greater than the region of small ISD so that the transmission mode for the area of small ISO will likely be insufficient to meet desired quality of service (QoS) requirements in the region of large ISD.

According to embodiments of the present invention, the robustness of the transmitted signal is set to meet minimum QoS requirements in the region having small ISD, and additional resources are allocated to the region having large ISD to provide greater robustness. An initial transmission of the broadcast service is made to all mobile terminals on a first set of resources used in all of the cells. In the region of large ISO, a second set of resources is used for a blind retransmission of the broadcast service.

The additional resources in the large ISO area may be used in several ways. In some exemplary embodiments, the additional resources in the large ISD areas are used to transmit the same information. The mobile terminals in the large ISD areas can then coherently add the signals received on the first and second sets of resources. The resulting energy and diversity gain increases the achievable SINR in the region of large ISD. This approach is particularly useful for noise limited cells. In other exemplary embodiments, the signal transmitted on the second set of resources adds incremental redundancy to the original signal transmitted on the first set of resources. This approach is particularly useful for interference limited cells.

Different options area available for signaling the resource allocations for the original transmission and retransmissions of the broadcast service. One option is to transmit a single resource allocation or MSAP in each cell in the broadcast service area. In one embodiment, all cells in the first and second regions are allocated the same radio frame period and offset, but with different subframe allocations. That is, cells in the region of large ISD would be allocated more subframes than cells in the region of small ISD. The subframes allocated to the region of large ISD may include all the subframes allocated to the region of small ISD plus an additional number of subframes. In another embodiment, the cells in the first and second regions are allocated different radio frame periods, but with the same offset and same subframes. Another option is to transmit multiple resource allocations or MSAPs in cells that fall within the region of large ISD, while cells in the small ISD region receive a single MSAP.

DETAILED DESCRIPTION

Figure 1:
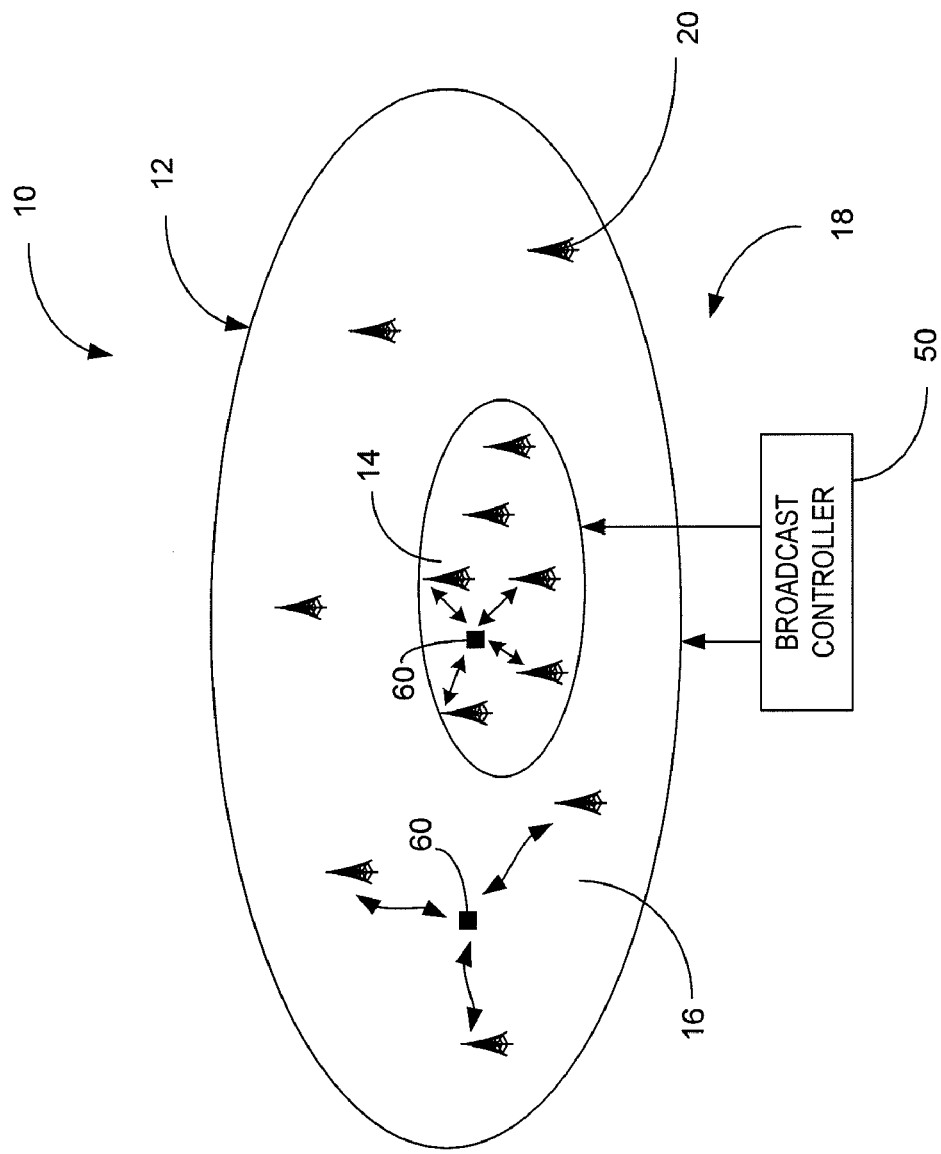
FIG. 1 illustrates an exemplary broadcast service area implementing a hierarchical transmission scheme.

Referring now to the drawings, FIG. 1 illustrates an exemplary mobile communication network 10 supporting Multimedia Broadcasts and Multicast Services (MBMS). MBMS enables multimedia content, such as television programs, movies, and other audio or video programs, to be transmitted to a mobile terminal 60 over the mobile communication network 10. The exemplary mobile communication network 10 is based on the Long-Term Evolution (LTE) architecture currently being developed by the 3rd Generation Partnership Project (3GPP). Those skilled in the art will appreciate, however, that the present invention is also applicable to other network standards, such as the Universal Mobile Telecommunications System (UMTS) Radio Access Network (UTRAN).

Mobile communication network 10 comprises a radio access network (RAN) 18 including a plurality of transmitter sites or base stations 20, called evolved node Bs (eNBs) in the LTE standard, that provide radio coverage in a broadcast service area 12. The broadcast service area 12 is configured as a MBMS single frequency network (SFN) in which the base stations 20 transmit the same content using the same set of resources. Thus, the broadcast service area will be referred to herein as the MBSFN service area. A broadcast controller 50 allocates resources for the broadcast service in each region 14, 16. The broadcast controller 50 may be implemented as a node in the RAN 18. The mobile terminals 60 in the MBSFN service area 12 can combine the broadcast service received from multiple base stations 20. Because the same broadcast service is being transmitted from all of the base stations 20 on the same resources in the MBSFN service area 12, there is no need to handover the mobile terminal 60 as it moves around in the MBSFN service area 12.

In the exemplary embodiment, MBSFN service area 12 comprises first and second regions, indicated at 14 and 16 respectively. The distance between base stations 20 in the first region 14, referred to herein as the inter site distance (ISD), is relatively small, while the ISD between base stations 20 in the second region 16 is relatively large. Consequently, $SINR_{min}$ in the second region 16 will be less than the $SINR_{min}$ in the first region 14. The MBSFN transmission is used in both the first region 14 and the second region 16.

According to embodiments of the present invention, the robustness of the transmitted signal is set to meet minimum quality of service (QoS) requirements in the region having small ISD, e.g., the first region 14, and additional resources are allocated to the region having large ISD, e.g., the second region 16, to provide greater robustness. More particularly, broadcast controller 50 allocates a first set of resources for use in both the first and second regions 14, 16 for an initial transmission of media data corresponding to a particular broadcast service. The transmission mode (e.g. modulation and coding scheme) for the initial transmission is determined based on the $SINR_{min}$ in the region with small ISO. Broadcast controller 50 also allocates a second set of resources for retransmission of media data in the region of large ISD, e.g., second region 16.

The additional resources in the large ISD region may be used in several ways. In one exemplary embodiment, the additional resources in the large ISD regions are used to transmit the same media data as the initial transmission. The mobile terminals 60 in the large ISD regions can then coherently add the signals received on the first and second sets of resources. For example, the mobile terminals 60 may use maximal ratio combining (MRC) to combine the signals received in the first and second sets of resources. The resulting energy and diversity gain increases the achievable SINR in the region of large ISD. This approach is particularly useful for noise limited cells. In a second exemplary embodiment, the signal transmitted on the second set of resources adds incremental redundancy to the original signal transmitted on the first set of resources. This approach is particularly useful for interference limited cells. The pending international application titled "Hierarchical Broadcast Transmission via Multiple Transmitters," International Publication No. WO 20081011898 A1 published January 2008, describes one broadcast system using a hierarchical transmission scheme. This publication is incorporated herein in its entirety by reference.

The transmission of the signal on the second set of radio resources is proposed to be implemented by using blind retransmissions, e.g., transport blocks (TB) are transmitted once in all cells of an MBSFN service area 12 for the initial transmission and retransmitted in subsequent subframes in a subset of the cells, e.g., those cells in the region with large ISD. The retransmissions are "blind" because the retransmissions are not performed on request, but according to a scheduled pattern. Only cells in the region of large ISD will need to implement the blind retransmissions. For example, blind retransmissions may be used in rural cells or other low density areas, where the traffic load is low, so that the MBSFN retransmissions could easily be afforded.

The resources used for blind retransmission in the region of large ISD can be used for other purposes in the region of small ISD. For example, the second set of resources allocated to the second region 16 for blind retransmissions can be used for unicast services in the first region 14. Therefore, different MBSFN resource allocations are required for different cells of the MBSFN service area 12.

Figure 2:
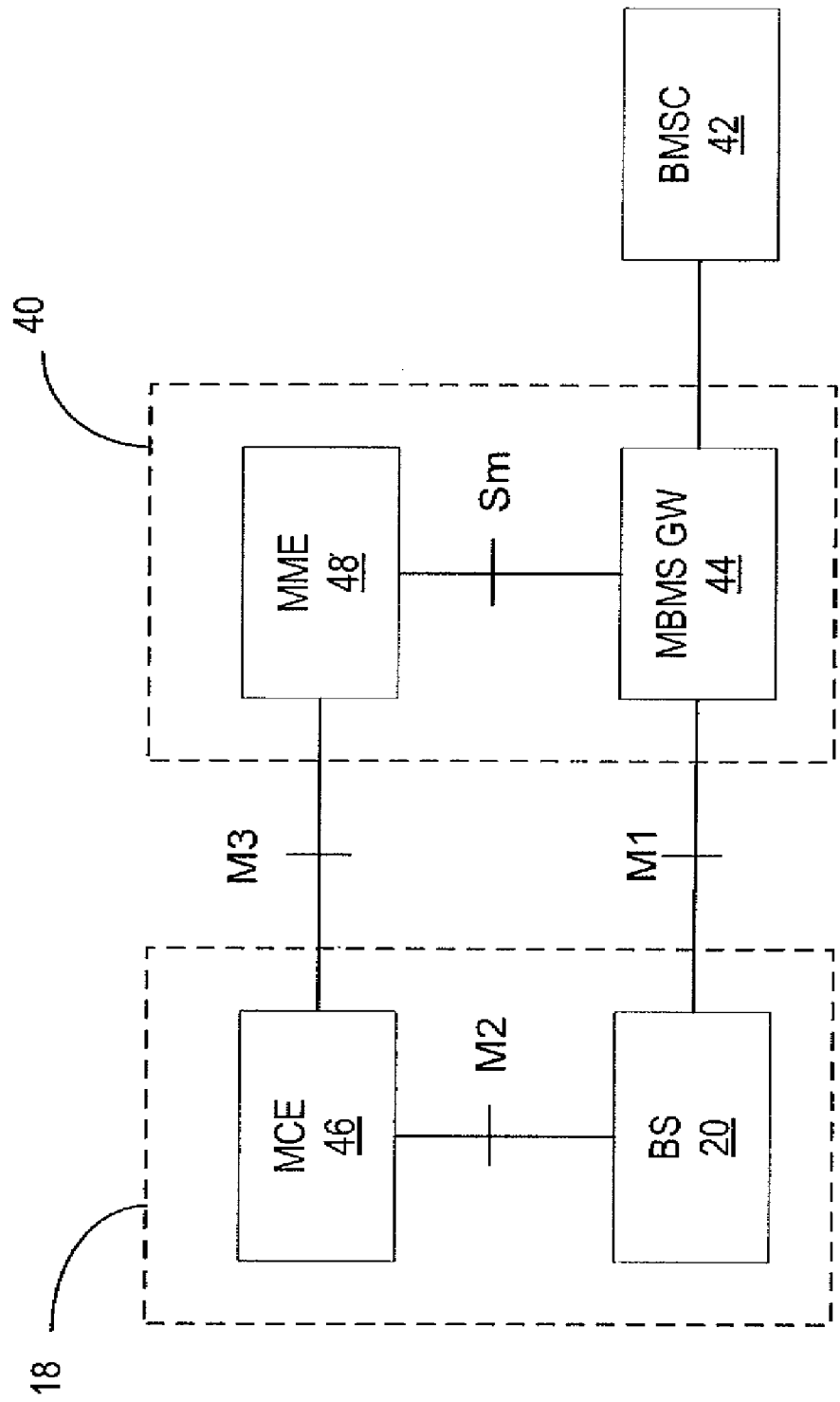
FIG. 2 illustrates the logical entities involved in transmitting broadcast services to a mobile terminal in the broadcast service area in an LTE network.

FIG. 2 illustrates the logical entities involved in transmitting broadcast services to a mobile terminal 100 in an LTE network. The multimedia content originates at a Broadcast Multicast Source (BMSC) 42, which may reside in a core network 40 or may reside in an external network such as the Internet. BMSC 42 is responsible for scheduling and announcing broadcast services and is the data source for the broadcast service. The MBMS Gateway (MBMS GW) 44 is a logical entity in the core network 40 that forwards broadcast packets to each base station 20 transmitting the broadcast service over the M1 interface, which is a user plane interface. The MBMS GW 44 may use the IP multicast to forward the broadcast packets to the base stations 20. The MBMS Coordination Entity (MCE) 46 is the logical entity that allocates resources used by the base stations 20 to transmit broadcast services. Thus, the MCE 46 functions as the broadcast controller 50 in the LTE architecture. The MCE 46 may also determine the modulation and coding schemes used for the broadcast service. The MCE communicates with the base stations 20 over the M2 interface. The MCE 46 may reside in the radio access network 18 and connect with a Mobility Management Entity (MME) 48 in the core network 40 over the M3 interface. The MME 48 is the logical entity that handles mobility management.

The logical channels for MBMS comprise the Multicast Traffic Channel (MTCH) and Multicast Control Channel (MCCH). The MTCH carries the media data for a broadcast service. One MTCH is configured for each broadcast service. The MCCH carries control information needed for reception of the MTCH. One MCCH can convey control information for many MTCHs. Both the MTCH and MCCH are mapped to a transport channel called the Multicast Channel (MCH) in MBMS transmission mode. Resources are allocated to a specific MCH by specifying a pattern of subframes, referred to herein as the MCH Subframe Allocation Pattern (MSAP).

Blind retransmissions may or may not be common for all multicast channels (MCHs) that are configured in the MBSFN service area 12. If there are multiple MCHs configured in an MBSFN service area 12 with different Modulation and Coding Schemes (MCSs), it may be sufficient to use the same number of blind retransmissions for all MCHs, in particular if Chase combining is used, because all MCHs see the same energy per symbol.

In LTE networks, MSAPs are signaled in the System Information Block 2 (SIB2) on the Broadcast Control Channel (BCCH). The MSAP indicates to the mobile terminals 60 in the MBSFN service area 12 the subframes allocated for a particular broadcast service. The message structure of the corresponding SIB2 part is reproduced from 3GPP TS 36.331; Evolved Universal Terrestrial Radio Access (E-UTRA) Radio Resource Control (RRC); Protocol specification; V8.4.0 (2008-December) here for convenience:

```
MBSFN-SubframeConfig ::=      SEQUENCE {
    radioframeAllocationPeriod    ENUMERATED {n1, n2, n4, n8,
    radioframeAllocationOffset    n16, n32}, INTEGER (0..7),
    subframeAllocation            CHOICE {
        oneFrame                      BIT STRING (SIZE(6)),
        fourFrames                    BIT STRING (SIZE(24))
    }
}
```

This message structure allows multiple MBSFN resource allocations or MSAPs in a cell, each one having its own radio frame period, offset (with respect to other MBSFN allocations), and subframe pattern. Different options are available for structuring the MBSFN resource allocations for the original transmission and retransmissions of the broadcast service. As used herein, the term retransmission refers to either retransmission of the same media data, or the transmission of additional media data to increase redundancy.

One option is to transmit one MSAP in each cell in the MBSFN service area 12. In one embodiment, all cells in the first and second regions 14, 16 are allocated the same radio frame period and offset, but with different subframe allocations. Cells in the region of large ISD, e.g., second region 16, would be allocated more subframes than cells in the region of small ISD, e.g., first region 14. The subframes allocated to the region of large ISD may include all the subframes allocated to the region of small ISD plus an additional number of subframes for the retransmission. In another embodiment, the cells in the first and second regions 14, 16 are allocated different radio frame periods, but with the same offset. The radio frame period for the first region 16 should be an integer multiple of the radio frame period for the second region 14 to ensure that the radio frames allocated in the first region 14 are also used in the second region 16.

Another option is to transmit multiple MSAPs in cells that fall within the region of large ISO, while cells in the small ISD region receive a single MSAP. For example, a first resource allocation or MSAP can be sent for the initial transmission in all cells in both the first and second regions 14, 16. A second resource allocation or MSAP can be sent in the second region 16. The second resource allocation should not have any subframes in common with the first resource allocation. A third resource allocation, and so on, could be made, with each additional allocation including subframes not used in prior allocations.

The current 3GPP assumption is that the Broadcast Control Channel (BCCH) contains information of an MBSFN Subframe Allocation Period (MSAP) that indexes into the MBSFN-Subframe Configuration for an MBSFN service area 12. In one exemplary embodiment, the MSAP has a cell specific part that indicates which of the subframes are used for which redundancy version. Basically this means one MSAP is sent for the first transmission and one MSAP is sent for each retransmission.

The dynamic scheduling information may or may not be contained in each retransmission occasion. If the service scheduling within a retransmission occasion is equal to the first transmission then no extra scheduling information for the retransmission is needed.

In one exemplary embodiment, the MSAP in cells transmitting a particular redundancy version and located at the border of the large ISD region using a the same redundancy version can be configured to suppress announcement of the subframes used for this redundancy version, so that the mobile terminals 60 located in these cells do not attempt to decode the retransmissions, which may suffer heavy interference from adjacent cells using the subframes for transmission of other signal.

Figure 3:
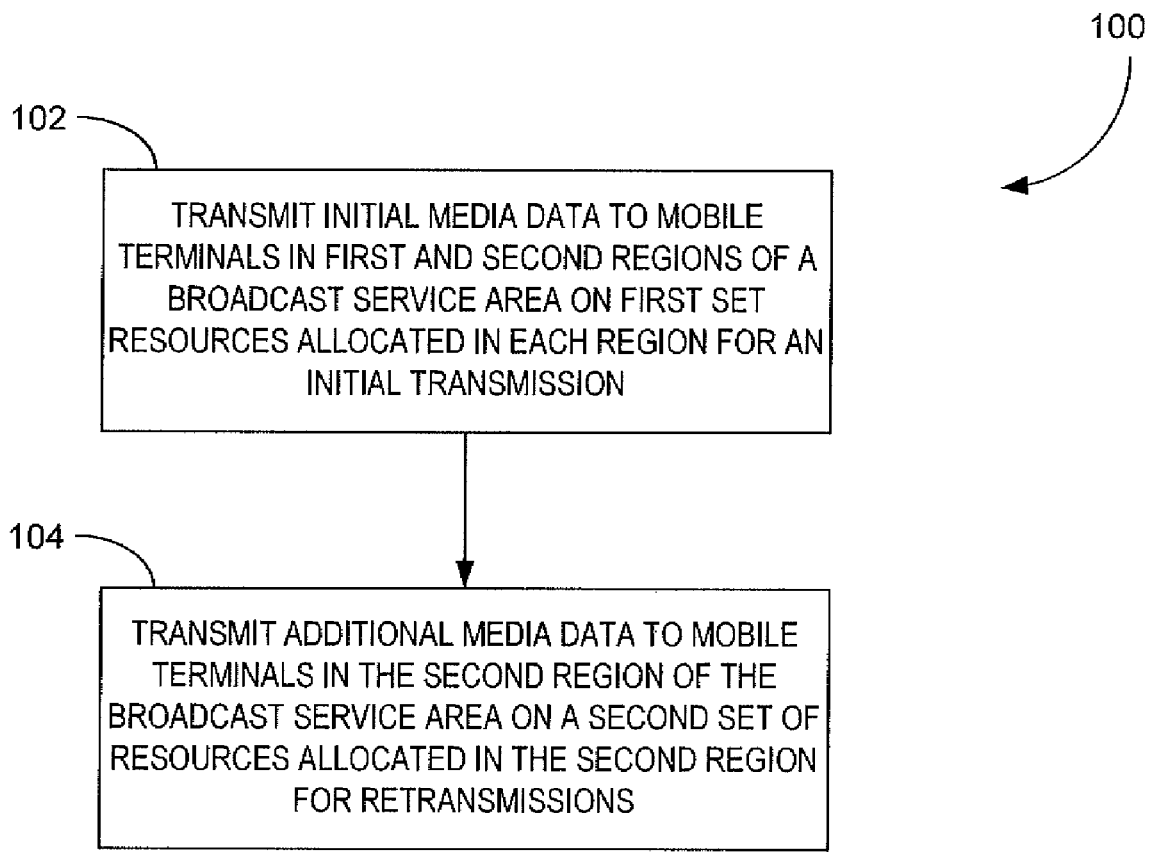
FIG. 3 illustrates an exemplary method implemented for transmitting a broadcast service.

FIG. 3 illustrates an exemplary method 100 for implementing a hierarchical transmission scheme in a broadcast service area 12. Initial media data is transmitted to mobile terminals 60 in first and second regions 14, 16 of the broadcast service area 12 on a first set of resources (block 102). As previously noted, the first set of resources may be the same in both the first and second regions 14, 16. Supplemental media data is then transmitted to mobile terminals 60 in the second region 16 of the broadcast service area 12 on a second set of resources (block 104). As previously noted, the retransmissions in the second region 16 are blind because the retransmissions are not requested by the mobile terminals 60. The resources used for the initial transmission and blind retransmission may be signaled on the BCCH as previously described.

Figure 4:
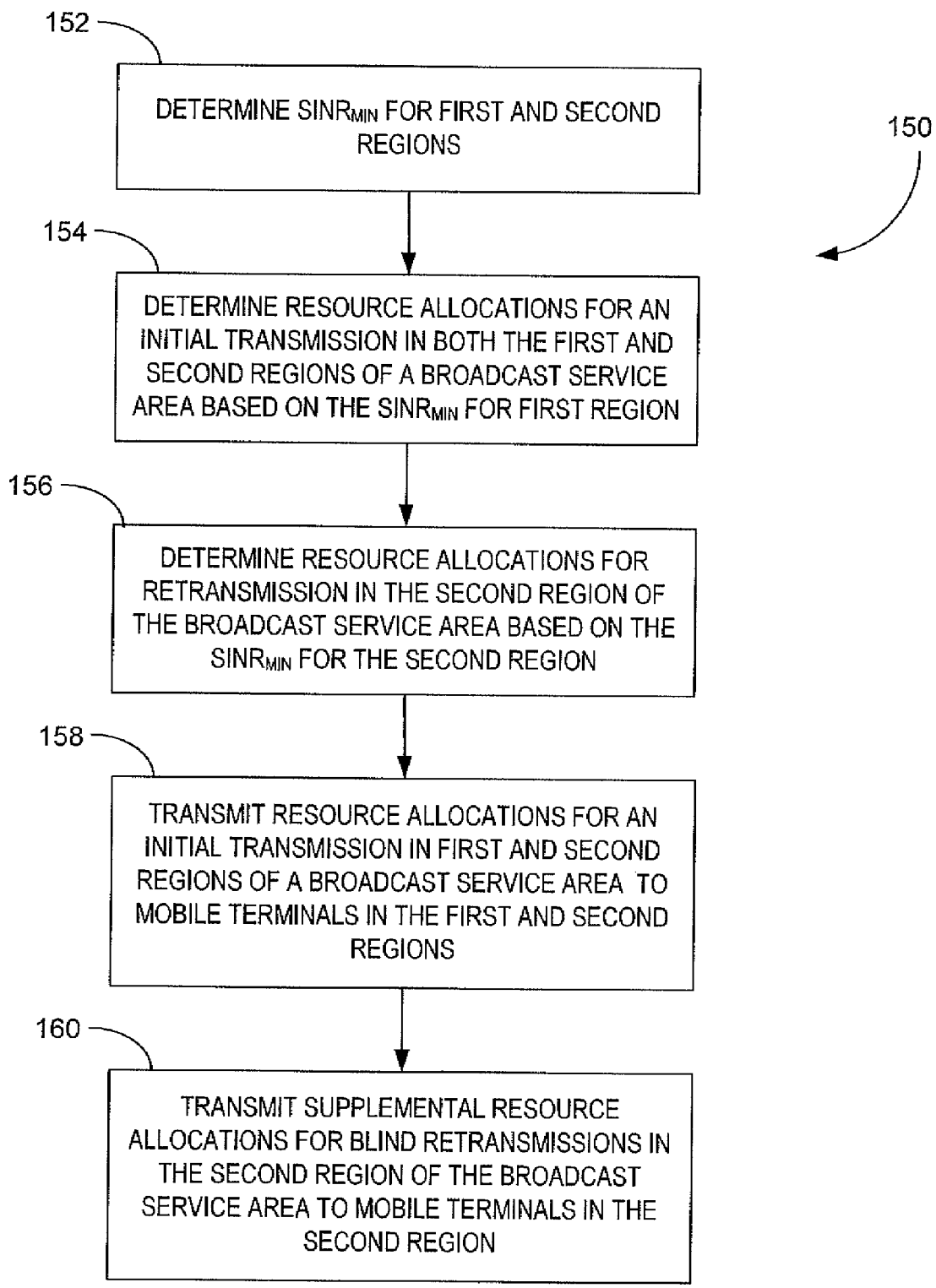
FIG. 4 illustrates an exemplary method implemented by a broadcast controller for allocating resources for a broadcast service using a hierarchical transmission scheme.

FIG. 4 illustrates an exemplary method 150 implemented by a broadcast controller 50 for allocating resources for hierarchical transmissions in a broadcast service area 12. Broadcast controller 50 determines the minimum SINR in the first and second regions 14, 16 (block 152). Based on the minimum SINR in the first region 14, the broadcast controller 50 determines a transmission mode for the initial transmission and allocates resources in the first and second regions 14, 16 for the initial transmission (block 154). Based on the minimum SINR in the second region 16, broadcast controller 50 allocates resources for the retransmission in the second region 16 (block 156). The broadcast controller 50 then transmits the resource allocations for the initial transmission in the first and second regions 14, 16 of the broadcast service area 12 to mobile terminals 60 in the first and second regions 14, 16 (block 158). Broadcast controller 50 also transmits supplemental resource allocations for blind retransmissions in the second region 16 of the broadcast service area 12 to mobile terminals 60 in the second region 16 (block 160). As described above, the resource allocations for the initial transmission and the blind retransmission in the second region 16 may comprise a single MSAP or multiple MSAPs.

Figure 5:
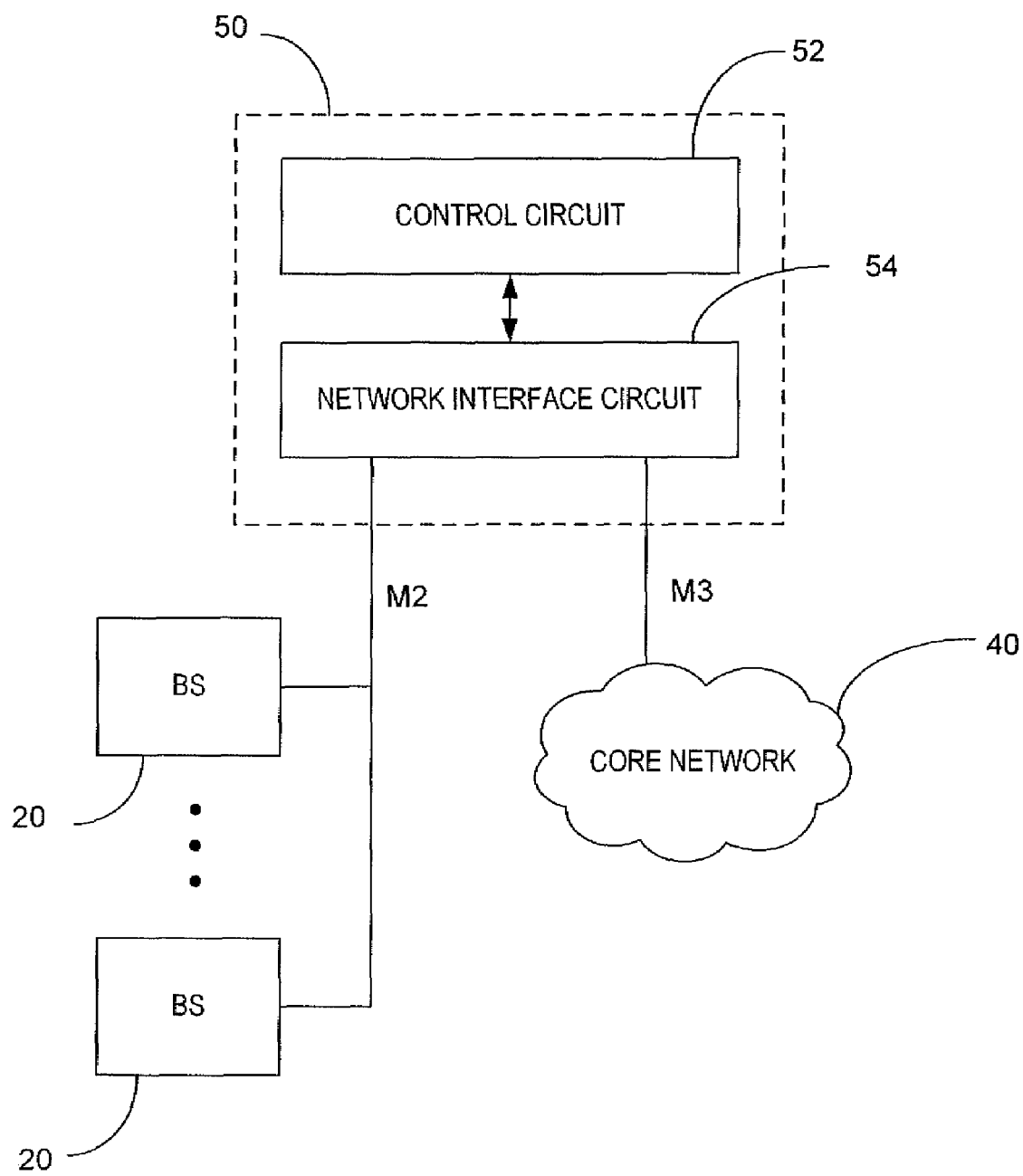
FIG. 5 illustrates an exemplary broadcast controller for implementing hierarchical transmission schemes in a broadcast service area.

FIG. 5 illustrates an exemplary broadcast controller 50 for implementing hierarchical transmission schemes in a broadcast service area 12. Broadcast controller 50 comprises a control circuit 52 and a network interface circuit 54. Control circuit 52, which may be implemented in a general purpose programmable processor or special purpose programmable processor, contains the application logic for determining resource allocations and transmitting the resource allocations to the base stations 20. Network interface circuit 54 provides connection to the base station 20 over the M2 interface and to the core network 40 over the M1 interface.

Figure 6:
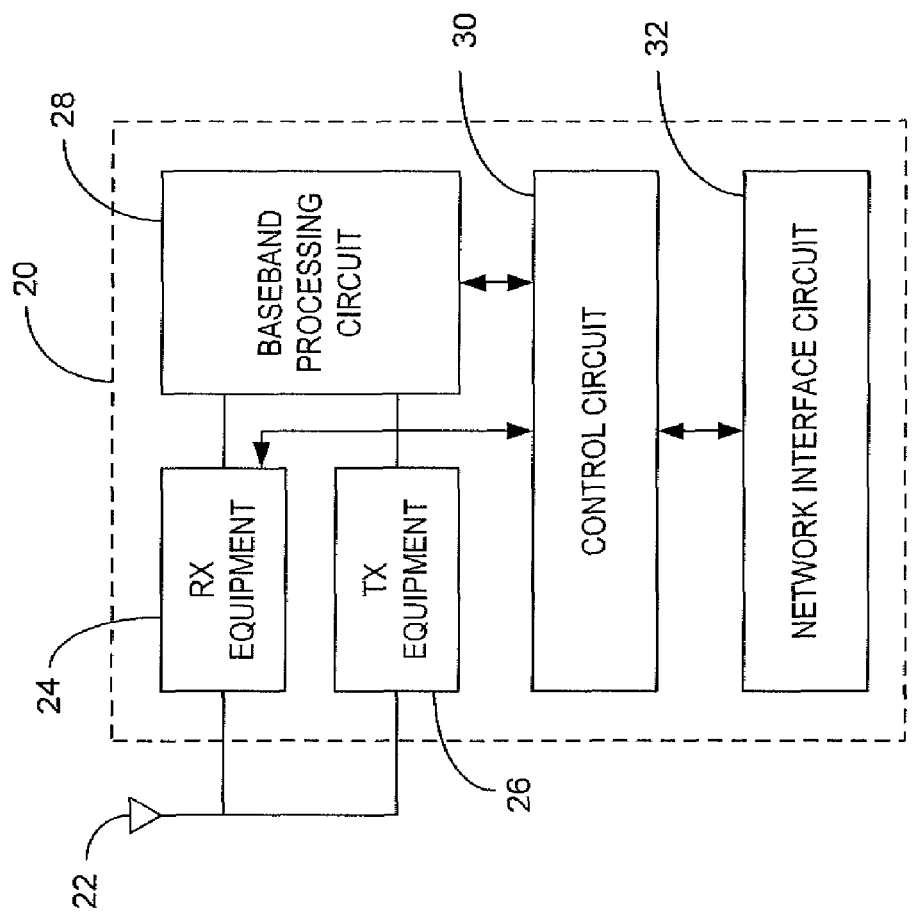
FIG. 6 illustrates an exemplary base station for transmitting a broadcast service using a hierarchical transmission scheme.

FIG. 6 illustrates the main functional components of a base station 20 implementing the hierarchical transmission scheme. Base station 20 comprises an antenna 22, reception equipment 24, transmission equipment 26, baseband processing circuit 28, control circuit 30, and network interface circuit 32. Reception equipment 24 and transmission equipment 26 are coupled to the antenna 22 for receiving and transmitting data, respectively. Baseband processing circuit 28 processes signals received by the reception equipment 24 and signals transmitted by the transmission equipment 26. Control circuit 30 controls the overall operation of base station 20 according to applicable standards. The network interface circuit 32 connects the base station 20 to the core network in which the broadcast controller 50 resides. The baseband processing circuit 28 and control circuit 30 may be implemented by a general purpose programmable processor or special purpose programmable processor. Further, those skilled in the art will appreciate that the baseband processing circuit 28 and control circuit 30 could be implemented in one or more separate processors, or in a single processor.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting media data in a broadcast service area having multiple transmitter sites with different inter-site distances between neighboring transmitter sites, wherein the broadcast service area comprises at least a first region characterized by relatively small inter-site distances between neighboring transmitter sites and a second region characterized by relatively large inter-site distances between neighboring transmitter sites, the method comprising:

broadcasting initial media data to mobile terminals in the first and second regions of the broadcast service area on a first set of resources allocated to both said first and second region for an initial transmission; and broadcasting supplemental media data in a blind retransmission to mobile terminals in the second region of the broadcast service area on a second set of resources allocated to the second region.

2. The method of claim 1 further comprising transmitting resource allocations for the initial transmission and the blind retransmission to mobile terminals in the first and second regions.

3. The method of claim 2 wherein transmitting resource allocations for the initial transmission and the blind retransmission comprises transmitting a single resource allocation in each of the first and second regions.

4. The method of claim 3 wherein the resource allocation in the first region comprises a radio frame period, offset, and a subframe allocation pattern for the initial transmission.

5. The method of claim 4 wherein the resource allocation in the second region comprises the same radio frame period and offset used in the first region with a different subframe allocation pattern that includes additional subframes for the blind retransmission.

6. The method of claim 3 wherein the resource allocation in the first region comprises a first radio frame period and offset, and wherein the resource allocation in the second region comprises a second radio frame period having the same offset as the first radio frame period.

7. The method of claim 6 wherein the radio frame allocation period for the first region is an integer multiple of the radio frame allocation period of the second region.

8. The method of claim 2 wherein transmitting resource allocations for the initial transmission and the blind retransmission comprises transmitting separate resource allocations in the second region for the initial transmission and the blind retransmission.

9. The method of claim 8 wherein the resource allocation for the initial transmission in the first and second regions are equal.

10. A wireless communication network for transmitting broadcast media to mobile terminals in a broadcast service area including at least a first region characterized by relatively small inter-site distances between neighboring transmitter sites and a second region characterized by relatively large inter-site distances between neighboring transmitters, the wireless communication network comprising:

a first set of transmitters in a first region of the broadcast service area configured to broadcast initial media data to mobile terminals in the first region on resources allocated to the first region for the initial transmission;

a second set of transmitters in a second region of the broadcast service area configured to broadcast, as part of the initial transmission, initial media data to mobile terminals in the second region on resources allocated to the second region for the initial transmission, and for broadcasting, as part of a blind retransmission, supplemental media data to mobile terminals in the second region of the broadcast service area on resources allocated to the second region for the retransmission; and a broadcast controller to allocate resources to the initial transmission and the blind retransmission.

11. The wireless communication network of claim 10 wherein the broadcast controller is configured to transmit resource allocations for the initial transmission and the blind retransmission to mobile terminals in the first and second regions.

12. The wireless communication network of claim 11 wherein the broadcast controller is configured to transmit a single resource allocation in each of the first and second regions.

13. The wireless communication network of claim 12 wherein the resource allocation in the first and second region comprises a radio frame period, an offset, and a subframe allocation pattern for the initial transmission.

14. The wireless communication network of claim 13 wherein the resource allocation in the second region comprises the same radio frame period and offset used in the first region with a different subframe allocation pattern that includes additional subframes for the blind retransmission.

15. The wireless communication network of claim 12 wherein the resource allocation in the first region comprises a first radio frame period and offset, and wherein the resource allocation in the second region comprises a second radio frame period having the same offset as the first radio frame period.

16. The wireless communication network of claim 15 wherein the radio frame allocation period for the first region is an integer multiple of the radio frame allocation period of the second region.

17. The wireless communication network of claim 10 wherein the broadcast controller is configured to transmit separate resource allocations in the second region for the initial transmission and the retransmission.

18. The wireless communication network of claim 17 wherein the resource allocation for the initial transmission in the first and second regions are equal.

19. A method of controlling wireless broadcast transmission of media data in a broadcast service area having multiple transmitter sites with different inter-site distances between neighboring transmitter sites, wherein the broadcast service area comprises at least a first region characterized by large inter-site distances between neighboring transmitter sites and a second region characterized by small inter-site distances between neighboring transmitter sites, the method comprising:
  allocating resources for an initial transmission of the media data in the first and second regions of the broadcast service area to mobile terminals in the first and second regions;
  allocating resources for blind retransmission of the media data in the second region to mobile terminals in the second region; and
  transmitting the resource allocations to base stations in the first and second regions of the broadcast service area.

20. The method of claim 19 wherein transmitting the resource allocations to the base stations in the first and second regions of the broadcast service area comprises transmitting a single resource allocation in each of the first and second regions.

21. The method of claim 20 wherein allocating resources for the initial transmission of the media data in the first region comprises allocating a radio frame period, an offset, and a subframe allocation pattern for the initial transmission.

22. The method of claim 21 wherein allocating resources in the second region for the initial transmission and blind retransmission comprises allocating the same radio frame period and offset used in the first region with a different subframe allocation pattern that includes additional subframes for the blind retransmission.

23. The method of claim 20 wherein allocating resources for the initial transmission in the first region comprises allocating a first radio frame period and offset for the initial transmission in the first region, and wherein allocating resources for the initial transmission and the blind retransmission in the second region comprises allocating a second radio frame period having the same offset as the first radio frame period.

24. The method of claim 23 wherein the radio frame allocation period for the first region is an integer multiple of the radio frame allocation period of the second region.

25. The method of claim 19 wherein transmitting the resource allocations to base stations in the first and second regions of the broadcast service area comprises transmitting separate resource allocations in the second region for the initial transmission and the blind retransmission.

26. The method of claim 25 wherein the resource allocation for the initial transmission in the first and second regions are equal.

27. A broadcast controller for controlling wireless transmission of broadcast media in a broadcast service area having multiple transmitter sites with different inter-site distances between neighboring transmitter sites, wherein the broadcast service area comprises at least a first region characterized by large inter-site distances between neighboring transmitter sites and a second region characterized by small inter-site distances between neighboring transmitter sites, the broadcast controller comprising a control circuit configured to:
  allocate resources for an initial transmission of the media data in the first and second regions of the broadcast service area;
  allocate resources for a blind retransmission of media data in the second region of the broadcast service area; and
  transmit the resource allocations to base stations in the first and second regions of the broadcast service area.

28. The broadcast controller of claim 27 wherein the control circuit is configured to transmit a single resource allocation in each of the first and second regions.

29. The broadcast controller of claim 28 wherein the resource allocation in the first region comprises a radio frame period, an offset, and a subframe allocation pattern for the initial transmission.

30. The broadcast controller of claim 29 wherein the resource allocation in the second region comprises the same radio frame period and offset used in the first region with a different subframe allocation pattern that includes additional subframes for the blind retransmission.

31. The broadcast controller of claim 29 wherein the resource allocation in the second region comprises a second radio frame period having the same offset as the first radio frame period used in the first region.

32. The broadcast controller of claim 31 wherein the radio frame allocation period for the first region is an integer multiple of the radio frame period for the second region.

33. The broadcast controller of claim 27 wherein the control circuit is configured to transmit separate resource allocations in the second region for the initial transmission and the blind retransmission.

34. The broadcast controller of claim 33 wherein the resource allocation for the initial transmission in the first and second regions are equal.

* * * * *

UNITED STATES PATENT AND TRADEMARK OFFICE
CERTIFICATE OF CORRECTION

PATENT NO. : 8,374,616 B2
APPLICATION NO. : 12/766977
DATED : February 12, 2013
INVENTOR(S) : Huschke et al.

Page 1 of 1

It is certified that error appears in the above-identified patent and that said Letters Patent is hereby corrected as shown below:

In the Specifications:

In Column 2, Line 28, delete "ISO will" and insert -- ISD will --, therefor.

In Column 2, Line 37, delete "ISO," and insert -- ISD, --, therefor.

In Column 2, Line 40, delete "ISO" and insert -- ISD --, therefor.

In Column 4, Line 10, delete "ISO." and insert -- ISD. --, therefor.

In Column 6, Line 11, delete "large ISO," and insert -- large ISD, --, therefor.

Signed and Sealed this
Third Day of September, 2013

Teresa Stanek Rea
*Acting Director of the United States Patent and Trademark Office*